(12) United States Patent
Suzuki

(10) Patent No.: US 8,210,633 B2
(45) Date of Patent: Jul. 3, 2012

(54) IMAGE DATA PROCESSING APPARATUS AND LIQUID EJECTION APPARATUS

(75) Inventor: Katsuaki Suzuki, Gifu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 185 days.

(21) Appl. No.: 12/830,057

(22) Filed: Jul. 2, 2010

(65) Prior Publication Data

US 2011/0001776 A1    Jan. 6, 2011

(30) Foreign Application Priority Data

Jul. 6, 2009  (JP) ................................. 2009-160052

(51) Int. Cl.
    *B41J 29/38*    (2006.01)
(52) U.S. Cl. ....... 347/14; 358/3.01; 358/3.03; 358/3.04; 358/3.06
(58) Field of Classification Search .................... 347/14; 358/3.01, 3.03, 3.04, 3.06
    See application file for complete search history.

(56) References Cited

U.S. PATENT DOCUMENTS

| 7,339,698 | B1* | 3/2008 | Ohta | .............................. 358/1.9 |
| 2006/0214979 | A1 | 9/2006 | Inoue | |
| 2006/0279600 | A1 | 12/2006 | Matsumoto et al. | |
| 2006/0290739 | A1 | 12/2006 | Hatayama | |
| 2007/0139452 | A1 | 6/2007 | Yamane | |
| 2010/0128315 | A1* | 5/2010 | Murakami | .................... 358/3.06 |
| 2010/0171988 | A1* | 7/2010 | Saiki et al. | .................... 358/3.03 |

FOREIGN PATENT DOCUMENTS

| JP | 2005-161630 A | 6/2005 |
| JP | 2006-272571 A | 10/2006 |
| JP | 2006-341519 A | 12/2006 |
| JP | 2007-001118 A | 1/2007 |
| JP | 2007-136722 A | 6/2007 |
| JP | 2007-185957 A | 7/2007 |

OTHER PUBLICATIONS

Japan Patent Office, Notice of Reasons for Rejection for Japanese Patent Application No. 2009-160052 (counterpart to above-captioned patent application), mailed Jun. 7, 2011.

* cited by examiner

*Primary Examiner* — Laura Martin
(74) *Attorney, Agent, or Firm* — Baker Botts L.L.P.

(57) ABSTRACT

Quantizing means generates a quantized density and a quantization error component for a target pixel in a plurality of pixels. A subtracter calculates, for the target pixel, a quantization error correction component by subtracting the density of the target pixel contained in preliminary ejection data from the quantization error component output from the quantizing means. An allocator allocates the quantization error correction component calculated by the subtracter to a plurality of the pixels around the target pixel. The quantizing means outputs the quantized density and the quantization error component of the target pixel by performing an addition using the density of the target pixel contained in the image data, the density of the target pixel contained in the preliminary ejection data, and the accumulated diffused error component assigned to the target pixel by the allocator when other pixels are quantized.

18 Claims, 12 Drawing Sheets

MAIN SCANNING DIRECTION

SUB SCANNING DIRECTION

FIG. 8

MEAN DENSITY
10

| THRESHOLD |
|---|
| 13 |
| 10 |
| 5 |

| DENSITY | QUANTIZED OUTPUT |
|---|---|
| 13~16 | 3 (LARGE DROPLET 12) |
| 10~12 | 2 (MEDIUM DROPLET 8) |
| 5~9 | 1 (SMALL DROPLET 4) |
| 0~4 | 0 (NO-EJECTION) |

IMAGE DATA PROCESSING APPARATUS AND LIQUID EJECTION APPARATUS

CROSS REFERENCE TO RELATED APPLICATION

The present application claims priority from Japanese Patent Application No. 2009-160052, which was filed on Jul. 6, 2009, the disclosure of which is herein incorporated by reference in its entirety.

BACKGROUND OF THE INVENTION

1 Field of the Invention

The present invention relates to an image data processing apparatus related to a liquid ejection apparatus which records an image on a recording medium by ejecting a liquid from a plurality of ejection openings, and a liquid ejection apparatus including the image data processing apparatus.

2 Description of the Related Art

An ink jet head of an ink-jet printer has a plurality of nozzles for ejecting therefrom ink towards a recording medium such as a print sheet. In such an ink jet head, ink in each nozzle is sometimes thickened over time and thereby causes unstable ink ejection characteristics and ejection defects. A known approach to prevent this problem is a preliminary ejection in which ink not contributing to image formation is ejected from the nozzles towards a recording medium for use in an image formation, thus preventing thickening of ink inside the nozzles.

SUMMARY OF THE INVENTION

In the above-mentioned approach, the ink ejected in the preliminary ejection adheres to a sheet and forms dots (hereinafter, flushing dots or preliminary dots). To reduce the visibility of these preliminary dots on the sheet, the position of each preliminary dot is determined to prevent a preliminary dot from overlapping with or being placed adjacent to another preliminary dot. However, when an error diffusion processing is performed to image data, preliminary dots may be formed nearby image dots in an outer edge portion of an image, and these preliminary dots become more conspicuous. To make these preliminary dots unnoticeable, an image to be formed may be analyzed and the preliminary dots may be formed based on the result of the analysis. This however requires calculation of the positions of preliminary dots for every image printed, taking into account a period elapsed without ink ejection for each nozzle, and the positional relation between an outer edge portion of an image and the preliminary dots. Thus, an enormous amount of calculation process is required.

It is therefore an object of the present invention to provide an image data processing apparatus which makes preliminary dots formed on a recording medium in a preliminary ejection unnoticeable through a small amount of calculation, and to provide a liquid ejection apparatus including the image data processing apparatus.

An image data processing apparatus of the present invention for a liquid ejection apparatus which ejects a liquid related to image formation and a liquid related to preliminary ejection from a plurality of ejection openings towards a recording medium includes: image data memory means, preliminary ejection data memory means, quantizing means, a subtracter, and an allocator. The image data memory means is for storing image data in which each pixel of a plurality of pixels disposed in a matrix has a density related to an image to be recorded on a recording medium. The preliminary ejection data memory means is for storing preliminary ejection data in which each pixel of the plurality of pixels has a density related to a preliminary ejection pattern to be formed on the recording medium through preliminary ejection. The quantizing means is for generating a quantized density for each one of target pixels in the plurality of pixels and for outputting a quantization error component occurring when generating the quantized density, the quantized density being generated by using one or more thresholds to quantize a density of each target pixel in the plurality of pixels into two or more values. The subtracter is for calculating a quantization error correction component for each one of target pixels in the plurality of pixels by subtracting a density of a target pixel contained in the preliminary ejection data from the quantization error component output from the quantizing means in relation to the target pixel. The allocator is for allocating the quantization error correction component calculated by the subtracter to a plurality of the pixels positioned around the target pixel. In this image data processing apparatus, the quantizing means outputs the quantized density and the quantization error component of the target pixel by performing an addition using the density of the target pixel contained in the image data, the density of the target pixel contained in the preliminary ejection data, and an accumulated diffused error component assigned to the target pixel by the allocator when other pixels are quantized.

BRIEF DESCRIPTION OF THE DRAWINGS

Other and further objects, features and advantages of the invention will appear more fully from the following description taken in connection with the accompanying drawings in which:

FIG. 8 shows an exemplary result of correcting a threshold by a threshold correcting unit of FIG. 6.

DESCRIPTION OF THE PREFERRED EMBODIMENTS

First Embodiment

Figure 1:
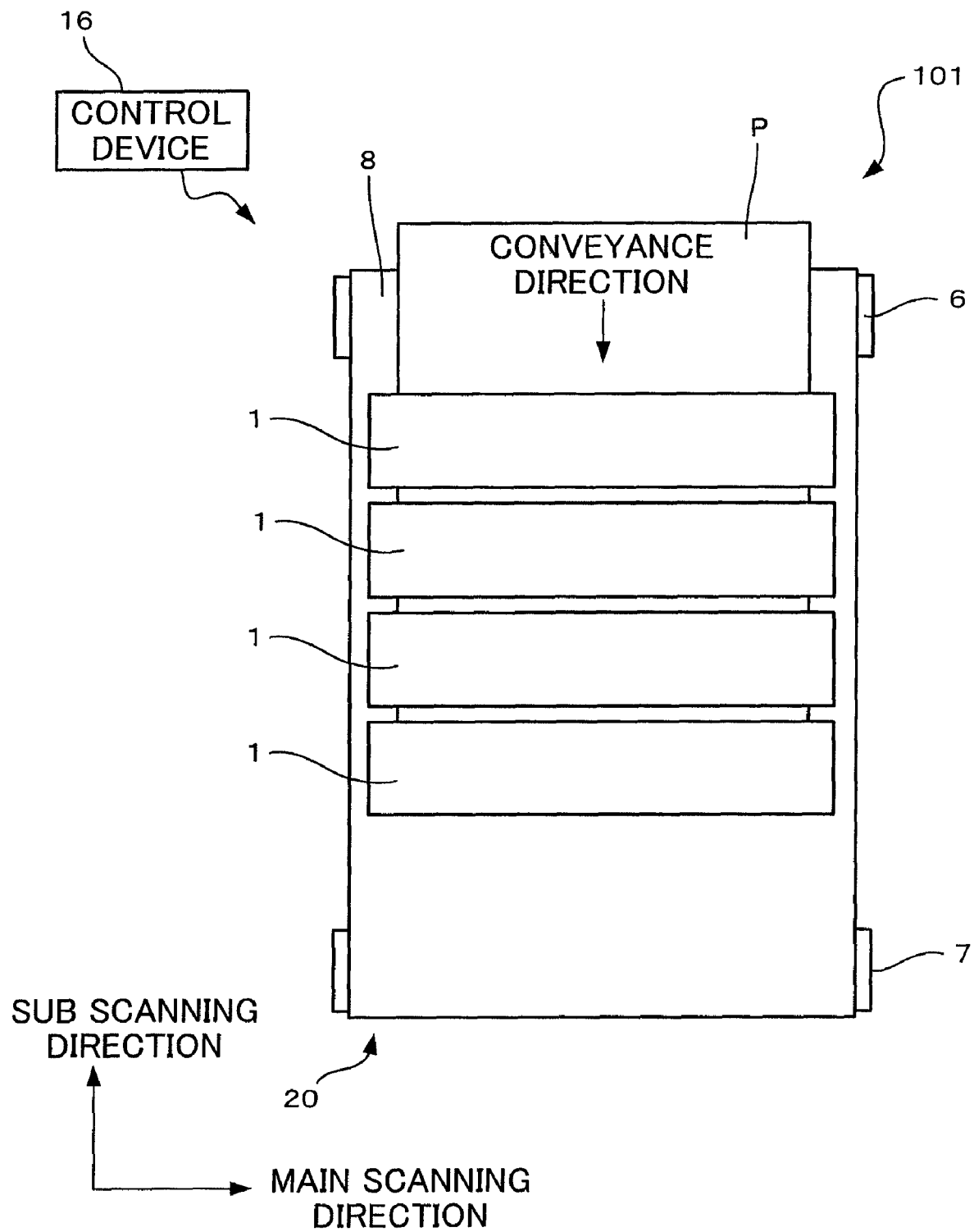
FIG. 1 is a plan view schematically showing an ink jet printer of a first embodiment, in accordance with the present invention.

As shown in FIG. 1, an ink jet printer 101 of a first embodiment according to the present invention includes: a conveyance unit 20 which conveys a sheet P in a direction from the top to the bottom of FIG. 1; four ink jet heads 1 which respectively eject Magenta ink, Cyan ink, Yellow ink, and Black ink to the sheet P conveyed by the conveyance unit 20; and a control device 16 which controls the entire ink jet printer 101. In the present embodiment, a sub scanning direction refers to a direction parallel to a conveyance direction in which a sheet P is conveyed by the conveyance unit 20, and a main scanning direction refers to a direction which perpendicularly crosses the sub scanning direction along the horizontal plane.

The conveyance unit 20 has two belt rollers 6 and 7, and an endless conveyor belt 8 looped around the both rollers 6 and 7. The belt roller 7 is a drive roller which is rotated by a drive force from a not-shown conveyance motor. The belt roller 6 on the other hand is a driven roller which is rotated as the conveyor belt 8 is run by the rotation of the belt roller 7. A sheet P placed on the outer circumference of the conveyor belt 8 is conveyed downward in FIG. 1.

The four ink jet heads 1 extend in the main scanning direction and are disposed parallel to each other. That is, the ink jet printer 101 is a line-type color ink jet printer in which a plurality of ejection openings 108 for ejecting ink are arrayed in the main scanning direction. The under surface of each ink jet head 1 serves as an ejection face on which the plurality of ejection openings 108 are arrayed.

The ejection face is parallel to and faces the outer circumference of the upper portion of the loop formed by the conveyor belt 8. When the sheet P conveyed by the conveyor belt 8 passes an area immediately below the four ink-jet heads 1, ink of various colors is successively ejected from the ink-jet heads 1 to the top surface of the sheet P, thus forming a desirable color image on the sheet P.

Figure 2:
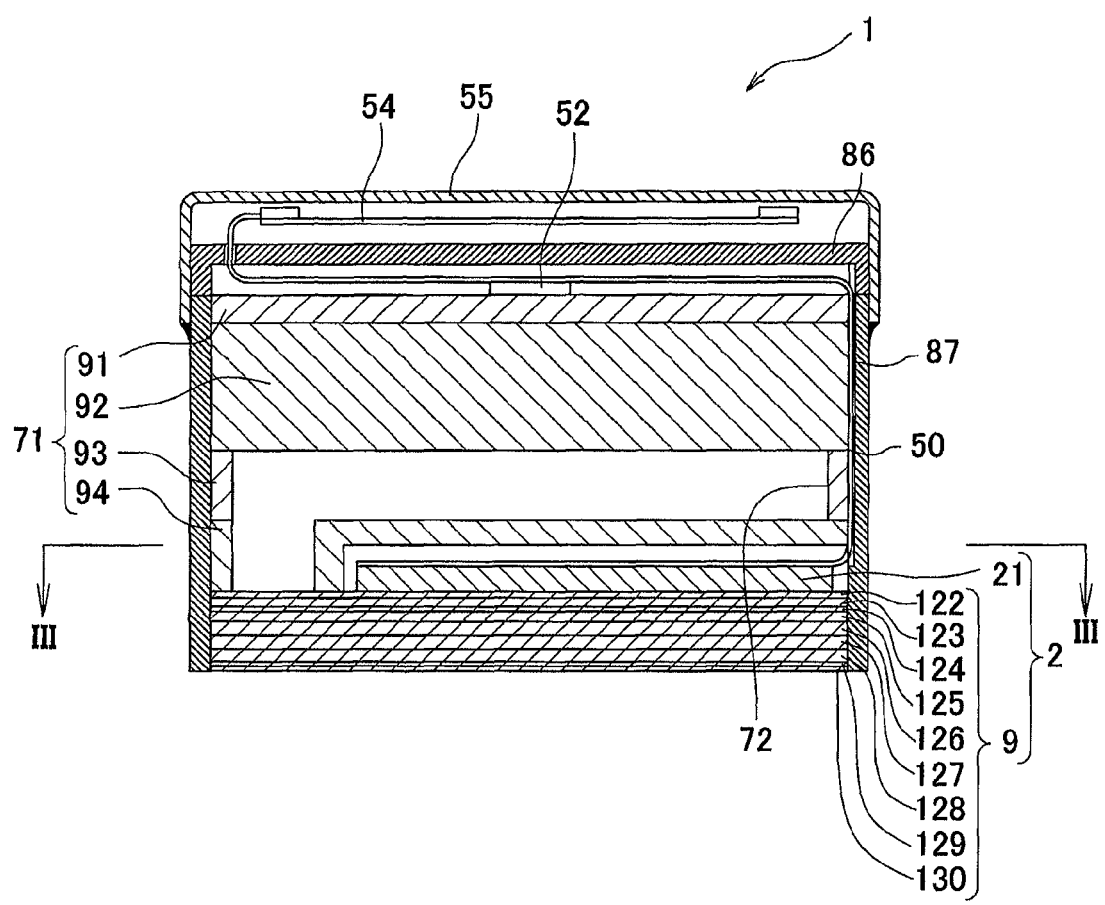
FIG. 2 is a cross sectional view taken along the sub scanning direction of the ink jet head shown in FIG. 1.
Figure 3:
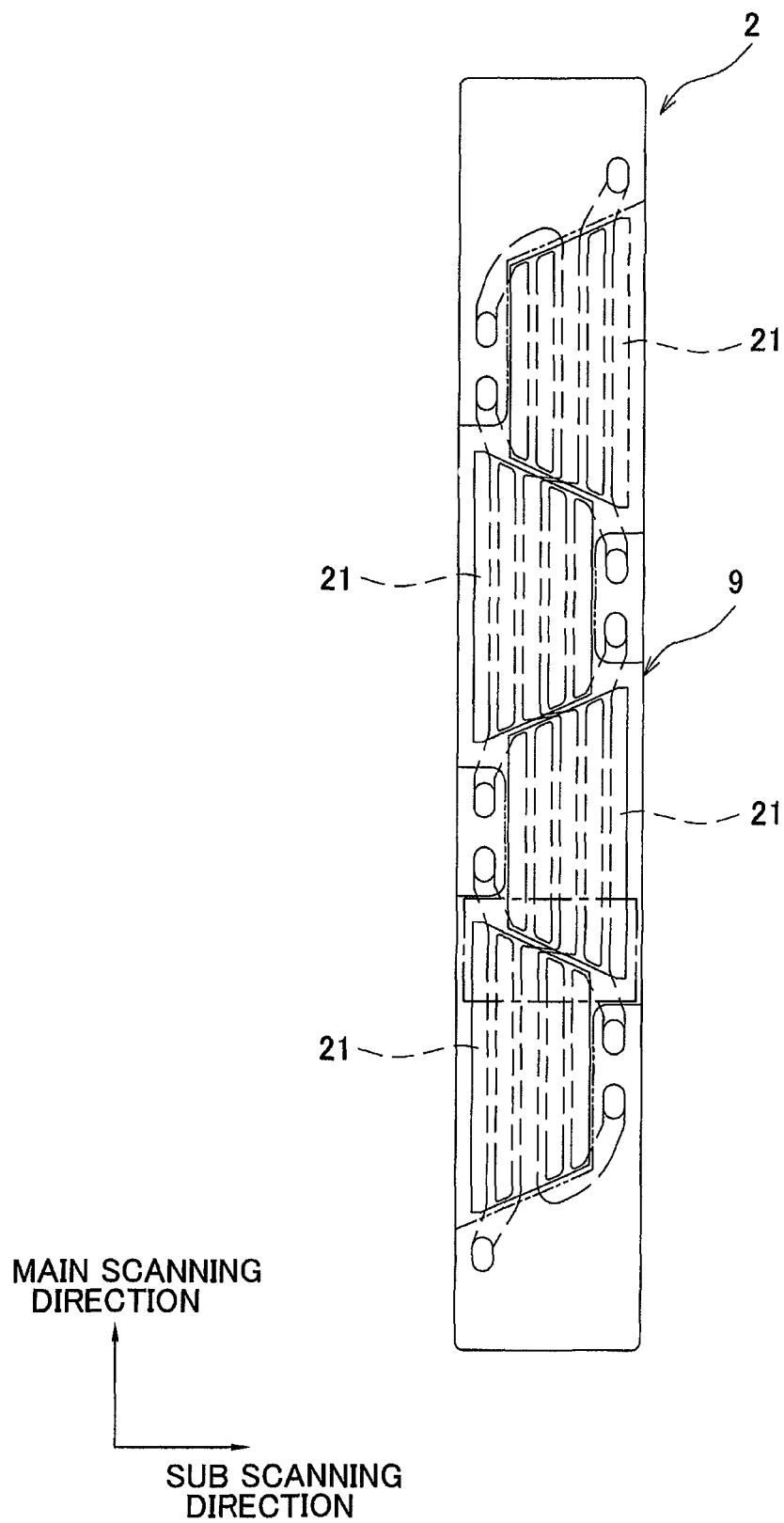
FIG. 3 is a cross sectional view taken along the line of FIG. 2.
Figure 4:
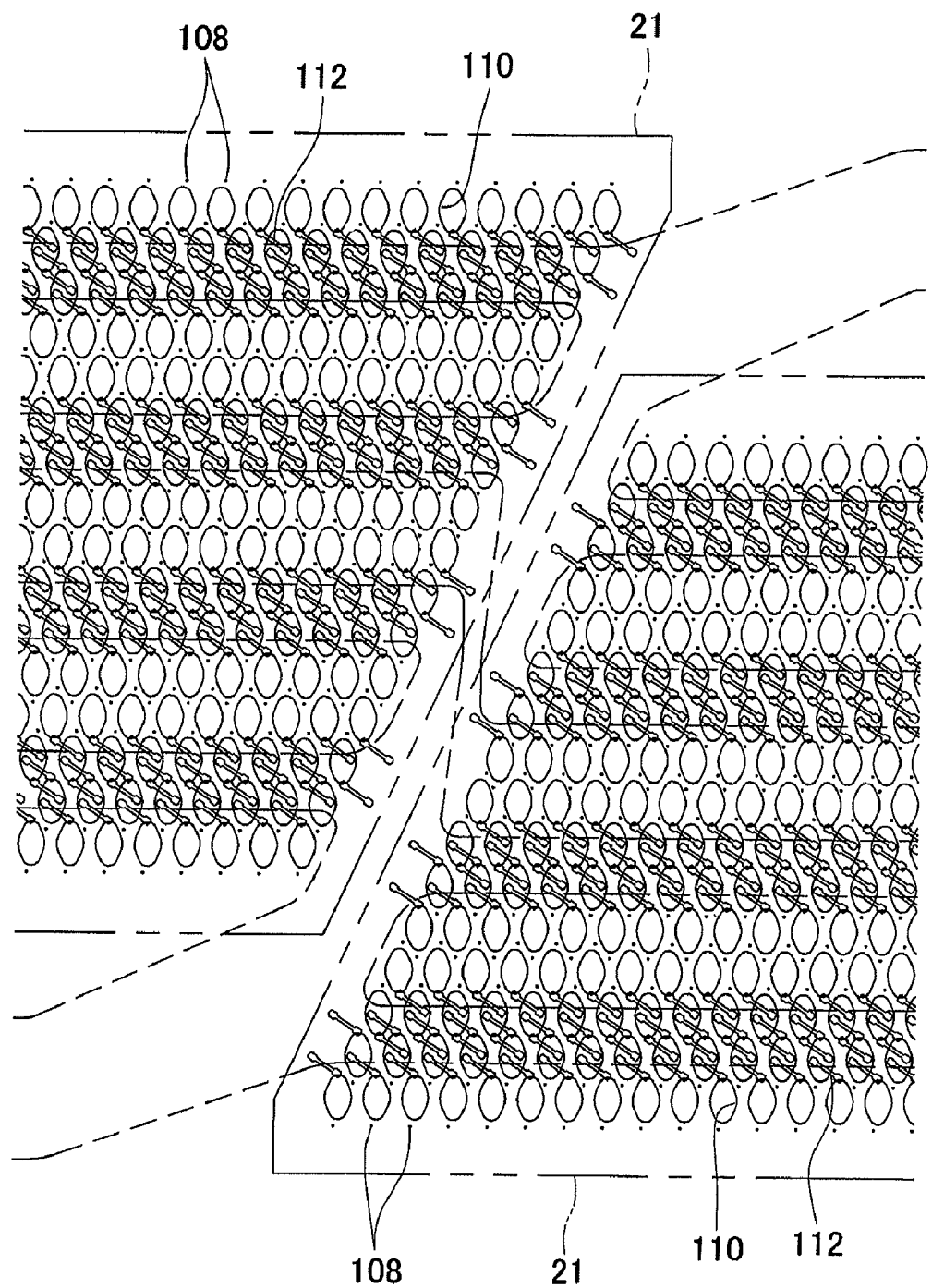
FIG. 4 is an enlarged view showing the area encircled by a single chain line in FIG. 3.

Next, the following details the ink-jet heads 1 with reference to FIG. 2 to FIG. 4. Note that a lower casing 87 is omitted in FIG. 3.

As shown in FIG. 2, each of the ink-jet heads 1 includes a head main body 2, a COF (Chip On Film) 50, and a control substrate 54. The head main body 2 has a reservoir unit 71, a passage unit 9, and an actuator unit 21. The COF 50 has thereon a driver IC 52, and has one end connected to the actuator unit 21 and another end connected to the control substrate 54. The reservoir unit 71 is a stack of four plates 91 to 94, and an ink reservoir 72 is formed inside the reservoir unit 71. The passage unit 9 is a stack of nine metal plates 122 to 130. The actuator unit 21 structures a plurality of actuators, and includes a common electrode and a plurality of individual electrodes. Between the common electrode and the individual electrodes is interposed a piezoelectric layer. Further, the ink-jet head 1 includes: an upper casing 86 and a lower casing 87 which form a box body surrounding therein the reservoir unit 71 and the passage unit 9; and a head cover 55 surrounding the control substrate 54 above the upper casing 86.

The control substrate 54 is disposed above the upper casing 86, and controls driving of the actuator unit 21 via the driver IC 52 of the COF 50. The driver IC 52 is for generating drive signals which drive the actuator unit 21.

The following describes the head main body 2. Note that pressure chambers 110, apertures 112, and ejection openings 108 below the actuator unit 21 should be drawn in broken lines; however, FIG. 4 provides illustration of these members and parts in solid lines.

As shown in FIG. 3, the head main body 2 is a stacked body including four actuator units 21 fixed on the top surface 9a of the passage unit. Inside the passage unit 9 are formed ink passages each including a pressure chamber 110. The actuator unit 21 includes a plurality of actuators each corresponding to one of the pressure chambers 110, and is capable of selectively applying ejection energy to the ink in the pressure chambers 110.

The under surface of the passage unit 9 serve as an ejection face disposing thereon a matrix of ejection openings 108. The ejection openings 108 are arrayed in the main scanning direction at an interval of 600 dpi which is the resolution relative to the main scanning direction.

Figure 5:
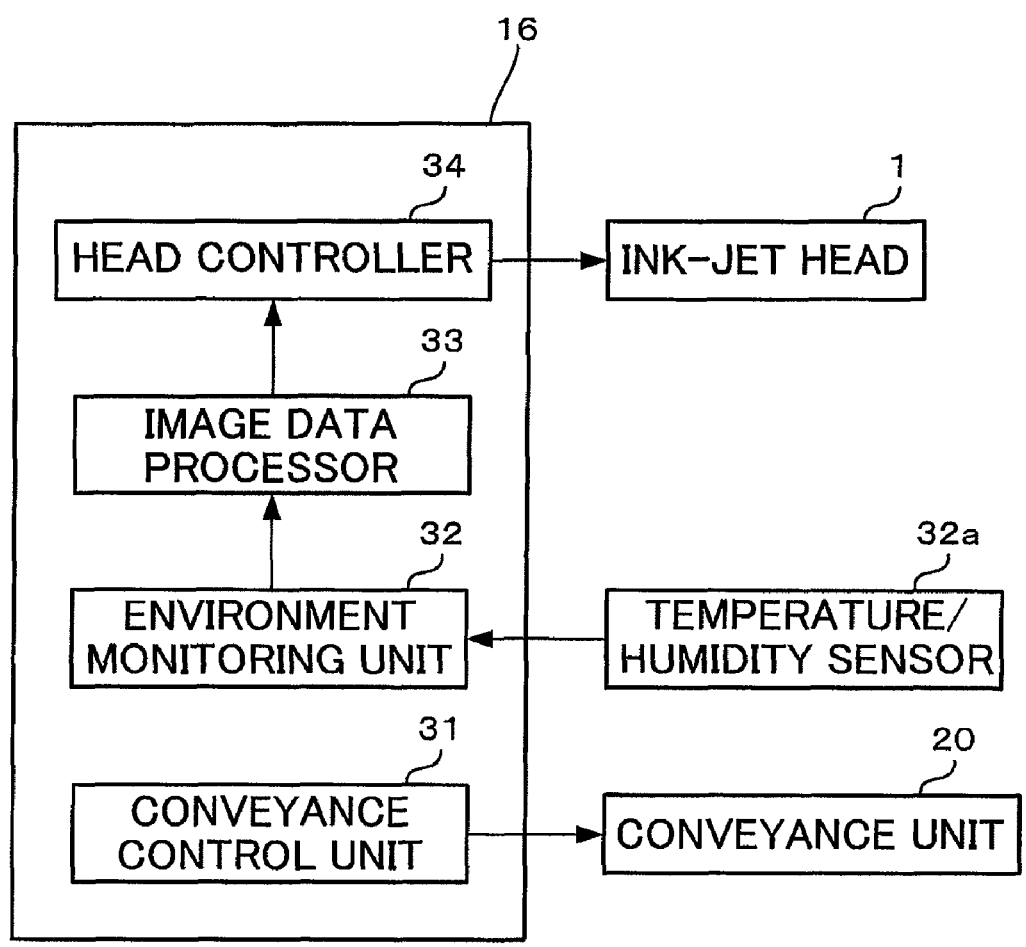
FIG. 5 is a functional block diagram of a control device shown in FIG. 1.

Next, the following describes the control device 16 with reference to FIG. 5. The control device 16 includes: a CPU (Central Processing Unit), an EEPROM (Electrically Erasable and Programmable Read Only Memory) which stores in a rewritable manner a program run by the CPU and data used in the program; and a RAM (Random Access Memory) which temporarily stores data while the program is run. Each functional part structuring the control device 16 is realized by cooperation of the hardware and the software in the EEPROM. As illustrated in FIG. 5, the control device 16 controls the entire ink-jet printer 101, and includes: a conveyance control unit 31, an environment monitoring unit 32, an image data processor 33, and a head controller 34.

The conveyance control unit 31 controls the conveyance motor in the conveyance unit 20 so that a sheet P is conveyed in the conveyance direction.

The environment monitoring unit 32 senses the temperature and the humidity around the ejection openings 108, based on output signals from a temperature/humidity sensor 32a provided inside the ink jet printer 101. The environment monitoring unit 32 then outputs a sensor signal to the image data processor 33.

The image data processor 33 generates drive data for driving the ink jet head 1, and outputs the drive data to the head controller 34. The drive data is generated by using image data related to an image to be printed on a sheet P and preliminary ejection data related to a preliminary ejection pattern formed on the sheet P by ejecting thickened ink inside the ejection openings 108. The drive data indicates a quantized density of each pixel out of a matrix of pixels arranged within a print area of a sheet P so as to correspond to a printing resolution relative to the main scanning direction and the sub scanning direction. The quantized density takes one of values from 0 to 3 which indicates the volume of ink to be placed in a single pixel, i.e., the size (planar dimension) of a single dot on the sheet P. The quantized density of 3 corresponds to a large droplet (12 pl). The quantized density of 2 corresponds to a medium droplet (8 pl). The quantized density of 1 corresponds to a small droplet (4 pl). The quantized density of 0 corresponds to no-ejection (0 pl). Of the plurality of pixels arrayed in the main scanning direction and forming a plurality of pixel columns, a pixel at the right end of the most downstream one of the pixel columns relative to the conveyance direction in FIG. 1 is set as a target pixel 81a (see FIG. 6). While this target pixel 81a is moved sequentially from the right to the left of the pixel column, the image data processor 33 outputs the quantized density of the target pixel 81a. This is done to each of the pixel column.

The head controller 34 drives the actuator unit 21 based on the drive data output from the image data processor 33. Thus, a desirable volume of ink is ejected from the ejection openings 108 at a desirable timing.

Figure 6:
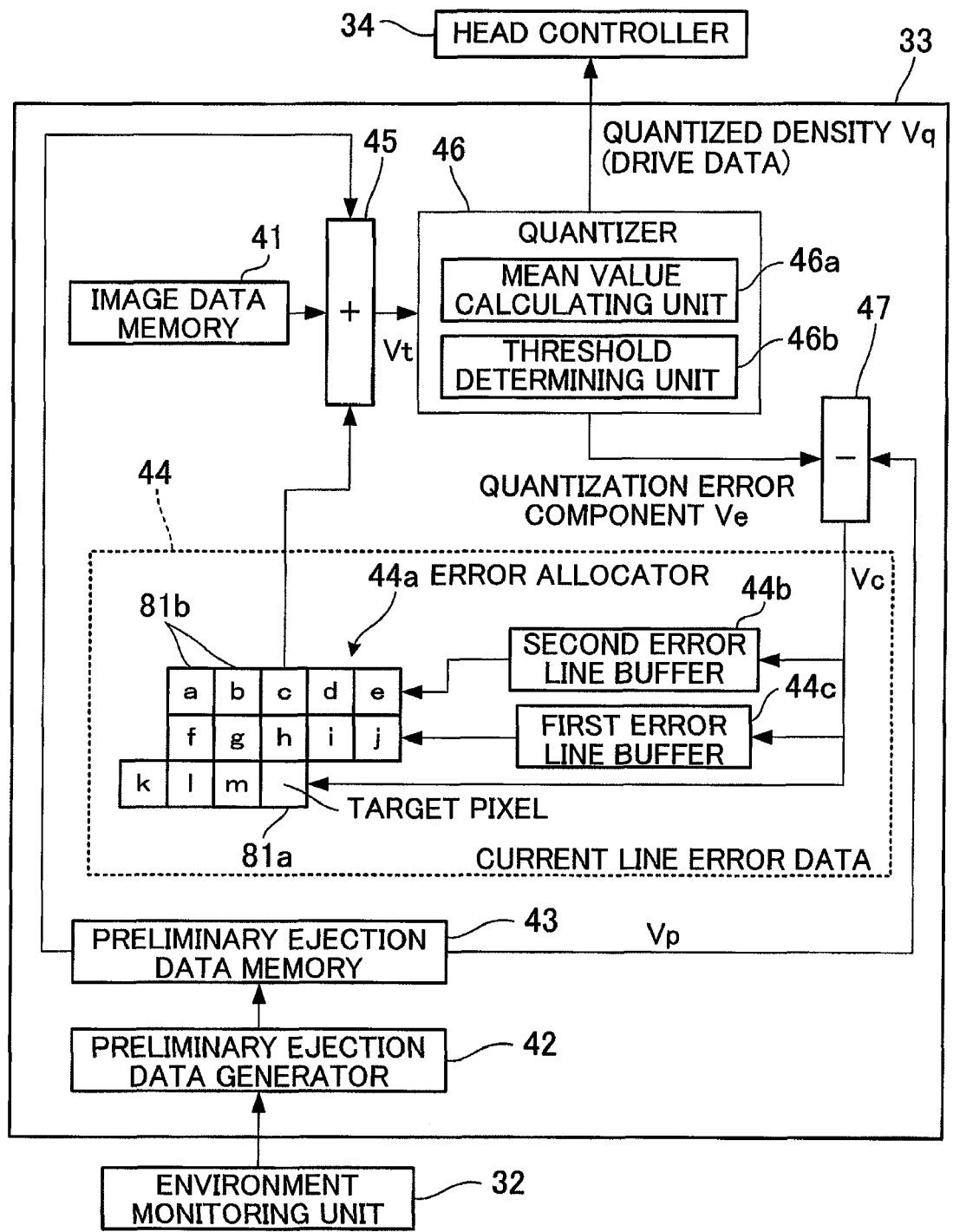
FIG. 6 is a functional block diagram of an image processing unit shown in FIG. 5.

The following details the image data processor 33. As shown in FIG. 6, the image data processor 33 includes an image data memory 41, a preliminary ejection data generator 42, a preliminary ejection data memory 43, an error allocator 44, an adder 45, a quantizer 46, and a subtracter 47. In the present embodiment, the adder 45 and the quantizer 46 structures the quantizing means.

The image data memory 41 stores image data related to an image to be printed on a sheet P. The image data indicates the density of each pixel out of a matrix of pixels arranged within a print area of a sheet P so as to correspond to a printing resolution relative to the main scanning direction and the sub scanning direction. In the present embodiment, the density is a volume of ink between 0 pl to 16 pl in increments of 1 pl.

Based on the sensor signal output from the environment monitoring unit 32, the preliminary ejection data generator 42 generates the preliminary ejection data related to the preliminary ejection pattern to be printed on the sheet P along with an image. Similarly to the image data, the preliminary ejection data indicates the density of each pixel out of a matrix of pixels arranged within a print area of a sheet P so as to correspond to a printing resolution relative to the main scanning direction and the sub scanning direction. In the present embodiment, the density of each pixel is a volume of ink which is 0 pl or 4 pl (small droplets). The preliminary ejection pattern is formed on the sheet P by ejecting small droplets of ink from all of the ejection openings 108 of the ink jet heads at a predetermined cycle based on the preliminary ejection data. This periodical ejection of thickened ink from all of the ejection openings 108 reliably maintains the ink ejection characteristics of the ejection openings 108.

The preliminary ejection data generator 42 determines the cycle of ejecting small droplets of ink from the ejection openings 108, based on the sheet P conveyance speed, the ink type, and the temperature and the humidity around the ejection openings 108 sensed by the environment monitoring unit 32. At this time, the preliminary ejection data generator 42 generates preliminary ejection data in such a manner that the cycle of ejecting small droplets of ink from the ejection openings 108 is made longer with a decrease in the temperature and an increase in the humidity around the ejection openings 108.

The preliminary ejection data memory 43 stores the preliminary ejection data generated by the preliminary ejection data generator 42.

In the present embodiment, the density of each pixel indicated by the image data and preliminary ejection data is a numerical value that indicates an amount of ink to be ejected. The density however may be a numerical value other than the numerical value indicating the amount of ink to be ejected. For example, the density may be any numerical value ranging from 0 to 255. In other words, the density may indicate any number of grayscale levels, as long as the number of grayscale levels surpasses four which is the number of grayscale levels given by the quantizer 46.

When the quantizer 46 quantizes the density of the target pixel 81a to be processed, the subtracter 47 generates a quantization error correction component Vc. The error allocator 44 allocates this quantization error correction component Vc to thirteen non-quantized pixels 81b positioned around the target pixel 81a. Specifically, the error allocator 44 generates thirteen diffused error components from the quantization error correction component Vc, and assigns the components to the thirteen non-quantized pixels 81b nearby the target pixel 81a. Furthermore, the error allocator 44 stores the diffused error components assigned to the thirteen non-quantized pixels 81b (described later).

The adder 45 calculates a total density Vt of the target pixel 81a, which is a total ejection amount of ink in increments of 1 pl, by summing up the density of the target pixel 81a contained in the image data stored in the image data memory 41, the density of the target pixel 81a contained in the preliminary ejection data stored in the preliminary ejection data memory 43, and an accumulated diffused error component (which may take a positive or a negative value as described later) for the target pixel 81a stored in the error allocator 44.

The quantizer 46 converts the total density Vt of each target pixel 81a calculated by the adder 45 into the quantized density Vq, by using three thresholds. The resulting quantized density Vq takes one of four values (i.e., 0, 1, 2, and 3) which correspond to 0, 4, 8, and 12 pl, respectively. The quantized density Vq is then output to the head controller 34. When the density of the target pixel 81a contained in the preliminary ejection data is not 0 pl, i.e., 4 pl, the quantizer 46 forcedly outputs the quantized density Vq=1 corresponding to a small droplet, even if the total density Vt is 0. Further, the quantizer 46 outputs an error component occurring when quantizing the total density Vt, as the quantization error component Ve related to the target pixel 81a. This error component is a difference between the total density Vt and one of the three thresholds closest to and not more than the total density Vt.

Figure 7:
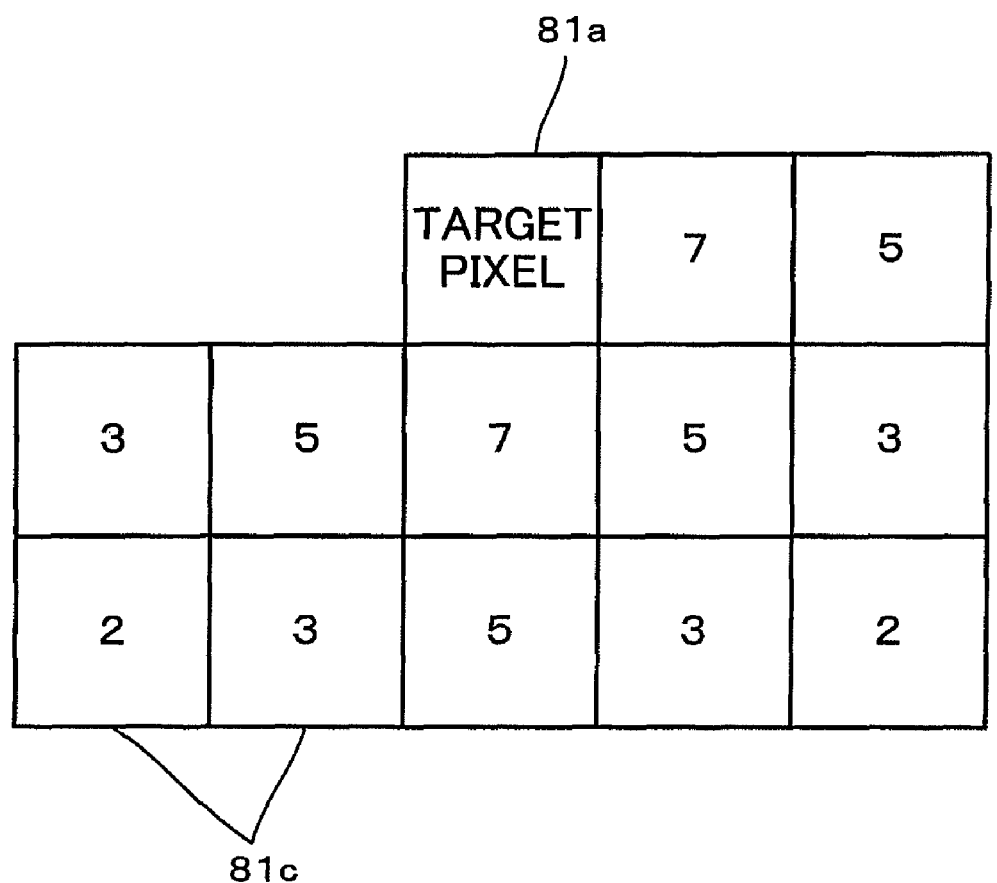
FIG. 7 shows a weighting matrix related to a mean value calculating unit shown in FIG. 6.

The quantizer 46 has a mean value calculating unit 46a and a threshold determining unit 46b, and performs quantization through the Mean Density Preservation Method. The mean value calculating unit 46a performs weighing process with respect to twelve quantized pixels 81c (previously quantized pixels) disposed around the target pixel 81a, whose respective quantized densities have been already generated by the quantizer 46. More specifically, the mean value calculating unit 46a weighs the density of each quantized pixel 81c, supposing that the density is one of the densities in the form of ink volume (i.e. one of 0, 4, 8, and 12) corresponding to the quantized density of that quantized pixel 81c, according to a weighing table (FIG. 7) such that the weight is increased with a decrease in the distance from the target pixel 81a. The twelve quantized pixels 81c are: two pixels in the same pixel column as the target pixel 81a, which are quantized immediately before the target pixel 81a; and five pixels in each of two pixel columns quantized immediately before the pixel column having the target pixel 81a, the five pixels including in the middle a pixel disposed at the same position as the target pixel 81a relative to the main scanning direction. After the weighing, the mean value calculating unit 46a calculates a mean value (mean density) of the twelve densities; twelve weighted ink volumes.

The threshold determining unit 46b determines the mean density calculated by the mean value calculating unit 46a as the median of the three thresholds for quantization, and determines the two other thresholds according to the median. Specifically, as illustrated in FIG. 8, where the mean density is 10 pl, the middle threshold is determined to 10 pl, and the two other thresholds are determined to 5 pl (the median of integers from 0 to 10) and 13 pl (the median of integers from 10 to 16), respectively. In the example of FIG. 8, the density of each pixel contained in the image data falls within a range of 0 to 16 pl as mentioned above. Thus, where the density of each pixel contained in the image data is within a range of 0 to 4 pl, the quantized density Vq=0 (no-ejection). Where the density is within a range of 5 to 9 pl, the quantized density Vq=1 (small droplet: 4 pl). Were the density is within a range of 10 to 12 pl, the quantized density Vq=2 (medium droplet: 8 pl). Where the density is within a range of 13 to 16 pl, the quantized density Vq=3 (large droplet: 12 pl). It should be noted that, when there are an even number of thresholds, the median is determined as to be the value of one of two thresholds closest to the middle.

The subtracter 47 outputs a quantization error correction component Vc to the error allocator 44. The quantization error correction component is a value resulting from a subtraction of a density Vp from the quantization error component Ve, where: the density Vp is the density of the target pixel 81a contained in the preliminary ejection data stored in the preliminary ejection data memory 43; and the quantization error component Ve relates to the target pixel 81a which is output from the quantizer 46. When Ve=Vp, the quantization error correction component Vc is zero. When Ve>Vp, the quantization error correction component Vc takes a positive value. When Ve<Vp, the quantization error correction component Vc takes a negative value.

Figure 9:
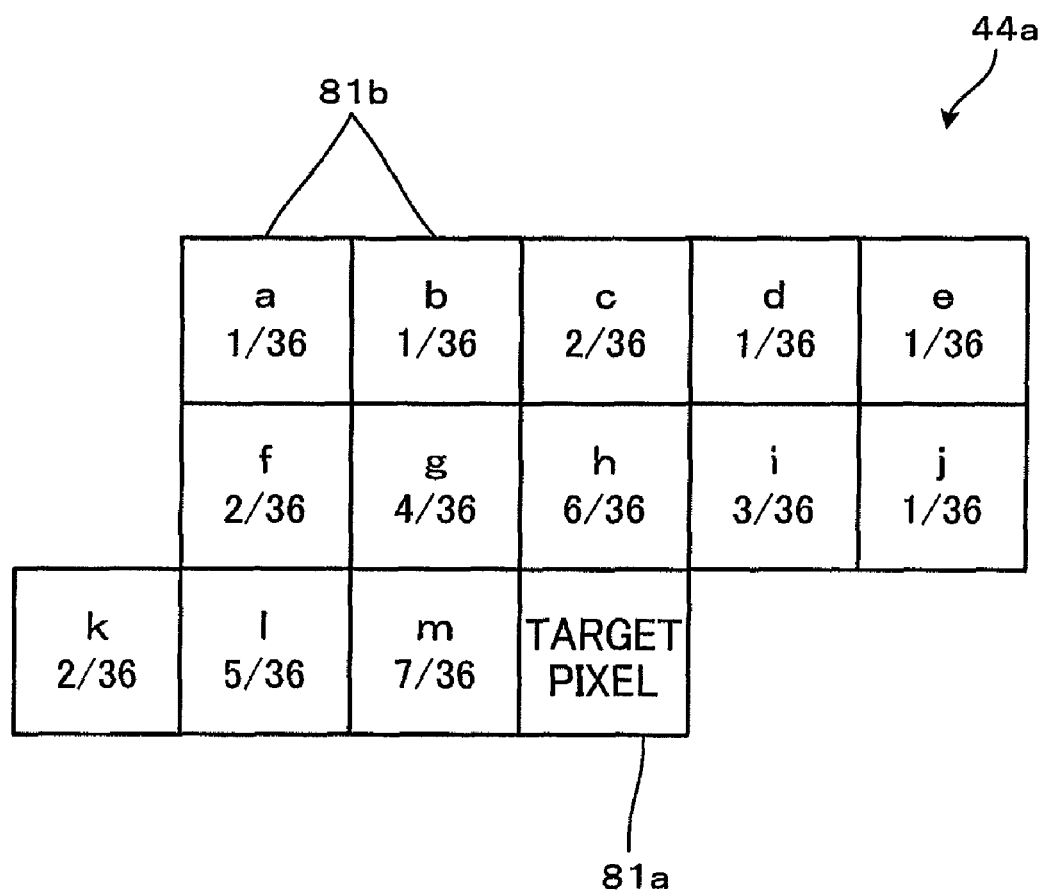
FIG. 9 is an explanatory diagram of an error distribution matrix shown in FIG. 6.

Next, the following describes the error allocator 44. The error allocator 44 includes an error diffusion matrix buffer 44a, a second error line buffer 44b, and a first error line buffer 44c. The error allocator 44 generates thirteen diffused error components from the quantization error correction component Ve which is related to the target pixel 81a and which is output from the subtracter 47. Around the target pixel 81a are thirteen non-quantized pixels 81b which are pixels not being processed. As shown in FIG. 9, the thirteen non-quantized pixels 81b include: three pixels k to m in the same pixel column as the target pixel 81a; five pixels f to j in a first adjacent pixel column which is an adjacent pixel column at immediately upstream of the pixel column having the target pixel 81a relative to the conveyance direction; and five pixels a to e in a second adjacent column which is an adjacent pixel column at the upstream of the first adjacent pixel column relative to the conveyance direction.

Each non-quantized pixel 81b is weighed so that the weight is increased with a decrease in the distance from the target pixel 81a. The error allocator 44 generates thirteen diffused error components, according to the weighting of the non-quantized pixels 81b exemplified in FIG. 9, from the quantization error correction component Vc which takes a positive or negative value or zero. The generated thirteen diffused error components each takes a positive or negative value or zero. The error allocator 44 then assigns the thirteen diffused error components to the thirteen non-quantized pixels 81b (pixels a to m). For each non-quantized pixel 81b are assigned thirteen diffused error components related to quantizing processes for thirteen target pixels 81a around the non-quantized pixel 81b. The diffused error component assigned to each non-quantized pixel 81b is accumulatively added in the error diffusion matrix buffer 44a. Note that the error allocator 44 may equally divide the quantization error correction component Vc into thirteen diffused error components, and assign the components to the non-quantized pixels 81b.

The second error line buffer 44b and the first error line buffer 44c each stores the diffused error components in units of pixel column. Specifically, of the non-quantized pixels 81b, the diffused error components assigned to pixel a to pixel e are accumulatively added in the second error line buffer 44b, whereas the diffused error components assigned to the pixel f to pixel j are accumulatively added in the first error line buffer 44c. Every time the target pixel 81a is moved, the diffused error components stored in the second error line buffer 44b and the first error line buffer 44c are loaded to the error diffusion matrix buffer 44a. The error diffusion matrix buffer 44a stores the accumulated diffused error components related to the thirteen non-quantized pixels 81b.

As is understood from the above, in the ink-jet printer 101 of the present embodiment, the density of the target pixel 81a contained in the image data, the density of the target pixel 81a contained in the preliminary ejection data, and the accumulated diffused error components of the target pixel 81a are summed up. This sum which is the total density Vt is quantized to calculate the quantized density Vq. Further, to calculate the quantization error correction component Vc and the diffused error components, the density Vp of the target pixel 81a contained in the preliminary ejection data is subtracted from the quantization error component Ve which occurs in the quantization. The diffused error components are assigned to thirteen non-quantized pixels 81b. Thus, unlike the cases of printing an image in which an image to be printed and a preliminary ejection pattern is simply overlapped, a dot (preliminary dot) formed on the sheet P by the preliminary ejection and a dot formed under a strong influence of the error diffusion component of the image data are restrained from being adjacent to each other. Thus the preliminary dots are prevented from being noticeable. This makes it possible to make preliminary dots formed on the sheet P in the preliminary ejection less noticeable with a less amount of calculation process, as compared with cases where image data is analyzed and preliminary dots are formed in less noticeable positions based on the result of the analysis. As a result, preliminary ejection towards the sheet P, while restraining deterioration of the print quality, is possible. Further, an increase in a formation ratio of the preliminary dots on a printed sheet and an increase in the total amount of ink ejected are both restrained.

Further, the print quality is improved, because the quantizer 46 quantizes the total density Vt through the Mean Density Preservation Method.

The mean value calculating unit 46a of the quantizer 46 weighs the density indicated in the form of ink volume corresponding to the quantized density of the quantized pixel 81c, according to the weighing table such that the weight is increased with a decrease in the distance from the target pixel 81a, and calculates the mean density of twelve densities thereafter. The print quality is therefore further improved.

Further, if the density of the target pixel 81a contained in the preliminary ejection data is not 0, the quantizer 46 forcedly outputs quantized density of the small droplet Vq (=1) even if the total density Vt is 0. This ensures that preliminary ejection is performed.

Further, the preliminary ejection data generator 42 generates preliminary ejection data such that a preliminary ejection pattern is formed by small droplets of ink ejected at a predetermined cycle from all the ejection openings 108 of the ink jet heads 1. Therefore, the preliminary ejection is repeated for every ejection opening 108 at a predetermined cycle, thus restraining deterioration of the ink ejection characteristics of the ejection openings 108.

The preliminary ejection data generator 42 determines the cycle of ejecting small droplets of ink from the ejection openings 108, based on the sheet P conveyance speed, the ink type, and the temperature and the humidity around the ejection openings 108 sensed by the environment monitoring unit 32. This restrains wasting of ink, while restraining deterioration of the ink ejection characteristics of the ejection opening 108.

First Modification

Figure 10:
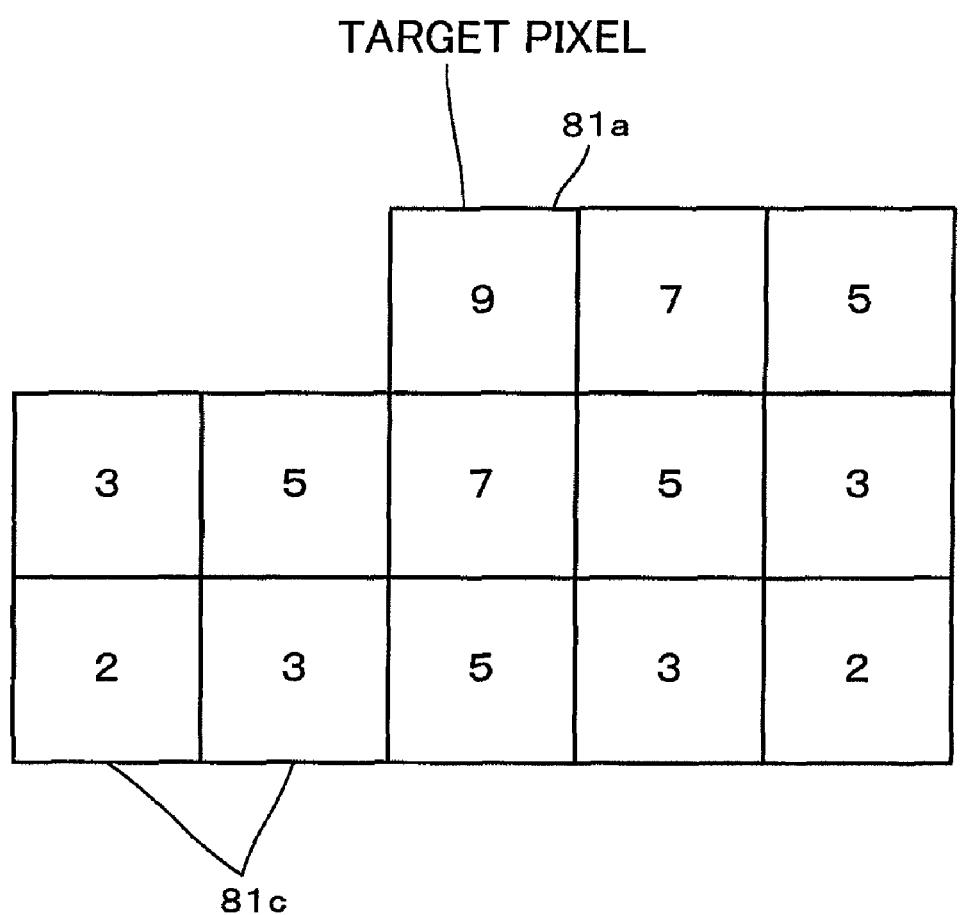
FIG. 10 is an explanatory diagram of a first variation of the first embodiment.

The above embodiment deals with a case where the quantizer 46 performs quantization through the Mean Density Preservation Method. However, the quantizer 46 may perform quantization through other methods. For example, quantization may be performed through the Mean Density Approximation Method. Specifically, the mean value calculating unit of the quantizer performs calculation of the mean value (mean density) of the densities related to thirteen pixels in total: i.e., a target pixel 81a and twelve quantized pixels 81c. This calculation is performed for each case where the density of the target pixel 81a is 0, 4, 8, and 12 respectively corresponding to the quantized densities of 0, 1, 2, and 3. It is preferable that the mean densities be calculated, after each density is weighed according to the weighing table shown in FIG. 10. Further, there is obtained absolute values of results of subtracting the total density Vt related to the target pixel 81a from the mean densities respectively calculated for the four quantized densities. Then, the quantized density corresponding to a threshold related to the smallest absolute value out of the four absolute values thus calculated is determined as the quantized density of the target pixel 81a. This enables improvement of the print quality through the Mean Density Approximation Method.

Second Modification

Figure 11A:
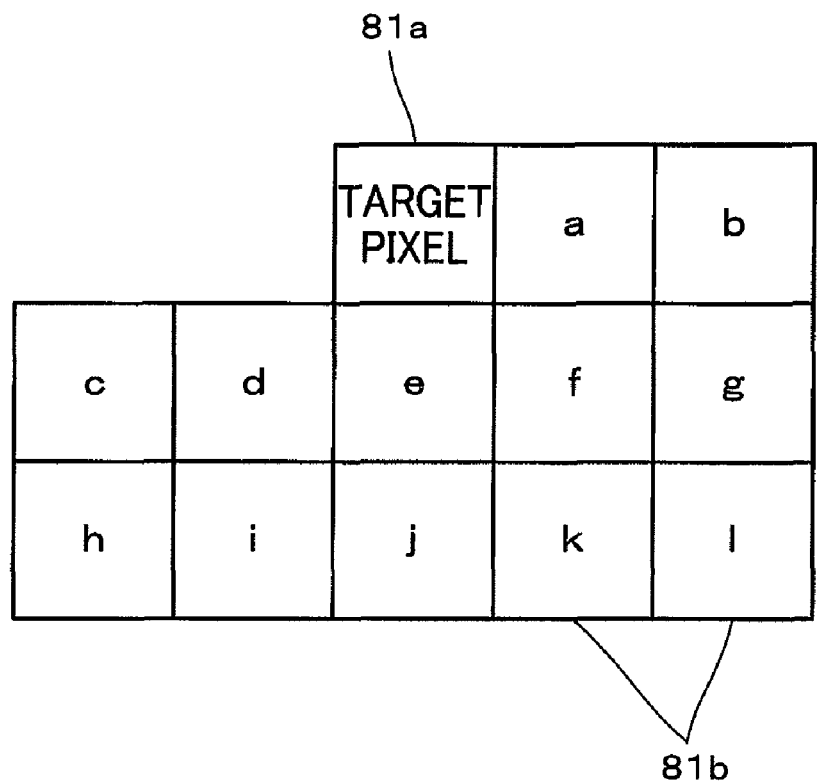
FIG. 11 is an explanatory diagram of a second variation of the first embodiment.
Figure 11B:
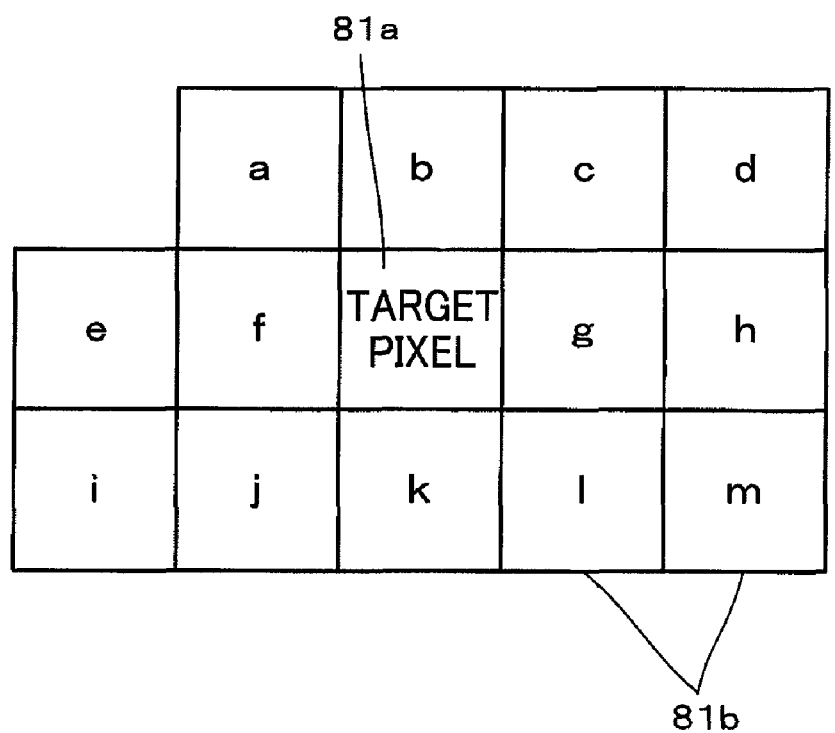

In the above embodiment, the quantization error correction component Vc related to the target pixel 81a is error-diffused to the following thirteen non-quantized pixels 81b: three pixels k to m in the same pixel column as the target pixel 81a; five pixels f to j in the first adjacent pixel column; and five pixels a to e in the second adjacent pixel column. However, the range of error diffusion is not limited to this, and may be any given range, provided that the error diffusion is performed to non-quantized pixels. For example, as illustrated in FIG. 11A, the error diffusion may be performed to the following twelve non-quantized pixels 81b: two pixels a and b in the same pixel column as the target pixel 81a; five pixels c to g in an adjacent pixel column at downstream of the pixel column having the target pixel 81a relative to the conveyance direction; and five pixels pixel h to l in an adjacent pixel column at downstream of the pixel column having the pixels c to g relative to the conveyance direction. Further, as illustrated in FIG. 11B, the error diffusion may be performed to the following thirteen non-quantized pixels 81b: four pixels e to h which are in the same pixel column as the target pixel 81a and are positioned on the left and right sides of the target pixel 81a; five pixels a to d in an adjacent pixel column at upstream of the pixel column having the target pixel 81a; and five pixels i to m in an adjacent pixel column at downstream of the pixel column having the target pixel 81a. Note that the sequence of the quantizing process is different from that of the above-mentioned embodiment, in modifications shown in FIG. 11A and FIG. 11B.

Second Embodiment

Figure 12:
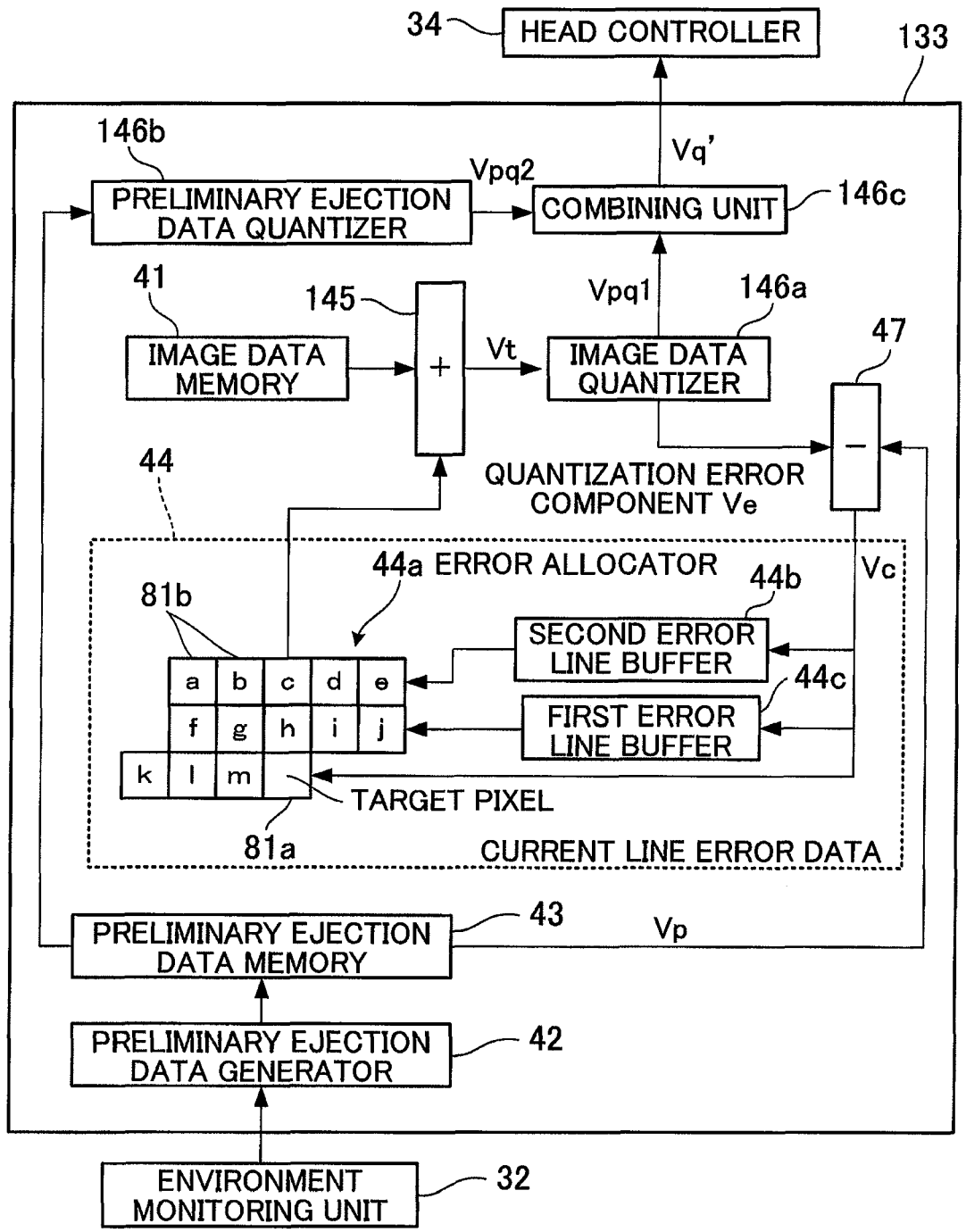
FIG. 12 is a functional block diagram of an image processing unit of a second embodiment, in accordance with the present invention.

Next, with reference to FIG. 12, the following describes an ink-jet printer of a second embodiment, according to the present invention. The ink jet printer of the present embodiment is the same as that of the ink jet printer 101 described in the first embodiment, except for the image data processor 133. The following description therefore mainly deals with the image data processor 133. The same symbols and reference numerals are given to members and parts that are identical to those described in the first embodiment, and no further description is provided for them. As shown in FIG. 12, the image data processor 133 includes: an image data memory 41, a preliminary ejection data generator 42, a preliminary ejection data memory 43, an error allocator 44, an adder 145, an image data quantizer 146a, a preliminary ejection data quantizer 146b, a combining unit 146c, and a subtracter 47. In the present embodiment, quantizing means is structured by the adder 145, the image data quantizer 146a (first quantizer), the preliminary ejection data quantizer 146b (second quantizer), and the combining unit 146c.

The adder 145 adds up the density of a target pixel 81a contained in the image data stored in the image data memory 41 and the accumulated diffused error component stored in the error allocator 44, to calculate a total density Vt as an amount of ink ejection in increments of 1 pl.

For each target pixel 81a, the image data quantizer 146a uses three thresholds to convert the total density Vt calculated by the adder 145 into a first preliminary quantized density Vpq1 which takes one of four values (0 to 3). Further, image data quantizer 146a outputs, as the quantization error component Ve related to the target pixel 81a, an error component which occurs in quantization of the total density Vt. This error component is a difference between the total density Vt and one of the three thresholds which most approximates the total density Vt but not exceeding the total density Vt.

The preliminary ejection data quantizer 146b uses three thresholds to convert the density of each target pixel 81a contained in the preliminary ejection data stored in the preliminary ejection data memory 43 into a second preliminary quantized density Vpq2 which takes one of four values (=0 to 3). Note that, in the present embodiment, if the density of the target pixel 81a contained in the preliminary ejection data is not zero, the density of the target pixel 81a is quantized into the quantized density of 1.

The combining unit 146c outputs a quantized density Vq' to the head controller 34 for each target pixel 81a. The quantized density Vq' is obtained by combining, i.e., adding up, the first preliminary quantized density Vpq1 output from the image data quantizer 146a and the second preliminary quantized density Vpq2 output from the preliminary ejection data quantizer 146b. At this time, if the first preliminary quantized density Vpq1 is 1 or greater, the combining unit 146c only outputs the first preliminary quantized density Vpq1 without adding thereto the second preliminary quantized density Vpq2. As a modification, the two preliminary quantized densities Vpq1 and Vpq2 may be simply added, if the first preliminary quantized density Vpq1 is 1 or greater. In this case, if the value resulting from the addition surpasses the maximum threshold, the output value of the quantized density Vq' is 3. The error component in this case is rounded down. The ink volume of the error component rounded down is a minute amount and hardly affects the print quality.

As is understood from the above, in the ink jet printer of the present embodiment, the first preliminary quantized density Vpq1 and the second preliminary quantized density Vpq2 are combined, the first preliminary quantized density Vpq1 being obtained by quantizing the total density Vt resulting from adding up the density of the target pixel 81a contained in the image data and the accumulated diffused error component related to the target pixel 81a, and the second preliminary quantized density Vpq2 being obtained by quantizing the density of the target pixel 81a contained in the preliminary ejection data. Further, the quantization error correction component Vc and the diffused error components are calculated by subtracting the density Vp of the target pixel 81a contained in the preliminary ejection data from the quantization error component Ve occurring in quantization related to the image data. The diffused error components are then assigned to thirteen non-quantized pixels 81b. Thus, unlike the cases of printing an image in which an image to be printed and a preliminary ejection pattern is simply overlapped, a dot (preliminary dot) formed on the sheet P by the preliminary ejection and a dot formed under a strong influence of the error diffusion component of the image data are restrained from being adjacent to each other. Thus the preliminary dots are prevented from being noticeable. This makes it possible to make preliminary dots formed on the sheet P in the preliminary ejection less noticeable with a less amount of calculation process, as compared with cases where image data is analyzed and preliminary dots are formed in less noticeable positions based on the result of the analysis. As a result, preliminary ejection towards the sheet P, while restraining deterioration of the print quality, is possible. Further, an increase in a formation ratio of the preliminary dots on a printed sheet and an increase in the total amount of ink ejected are both restrained.

Other Modifications

Other modifications of the above-mentioned embodiment are described below. The above embodiment deals with a structure where image data is quantized into quantized density which takes one of four values. It is however possible to adopt a structure which quantizes image data into a quantized density taking one of two values, one of three values, or one of five or more values.

The first embodiment deals with a case where the quantizer 46 forcedly outputs quantized density Vq=1 corresponding to a small droplet, when the density of the target pixel 81a contained in the preliminary ejection data is not 0, even if the total density Vt is 0. This forced output however is not necessary.

In the above embodiment, the preliminary ejection data generator 42 determines the cycle of ejecting small droplets of ink from the ejection openings 108, based on the conveyance speed of a sheet P, the ink type, and the temperature and the humidity around the ejection openings 108. Further, the preliminary ejection data is generated based on the cycle thus determined. However, the preliminary ejection data generator may generate the preliminary ejection data based on a cycle determined based on at least one of the conveyance speed of a sheet P, the ink type, and the temperature and the humidity around the ejection openings 108. Alternatively, it is possible to use the preliminary ejection data stored beforehand, instead of generating the preliminary ejection data.

The present invention is also applicable to a recording apparatus which ejects a liquid other than ink. Further, the application of the present invention is not limited to a printer, the present invention is applicable to facsimiles, photocopiers, and the like.

Further, the above embodiment deals with a case where the ink jet printer 101 is the image data processing apparatus of the present invention. However, the image data processing apparatus of the present invention may be a computer which generates drive data from image data.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. An image data processing apparatus for a liquid ejection apparatus which ejects a liquid related to image formation and a liquid related to preliminary ejection from a plurality of ejection openings towards a recording medium, the apparatus comprising:
   image data memory means for storing image data in which each pixel of a plurality of pixels disposed in a matrix has a density related to an image to be recorded on a recording medium;
   preliminary ejection data memory means for storing preliminary ejection data in which each pixel of the plurality of pixels has a density related to a preliminary ejection pattern to be formed on the recording medium through preliminary ejection;
   quantizing means for generating a quantized density for each one of target pixels in the plurality of pixels and for outputting a quantization error component occurring when generating the quantized density, the quantized density being generated by using one or more thresholds to quantize a density of each target pixel in the plurality of pixels into two or more values; and
   a subtracter for calculating a quantization error correction component for each one of target pixels in the plurality of pixels by subtracting a density of a target pixel contained in the preliminary ejection data from the quantization error component output from the quantizing means in relation to the target pixel;
   an allocator for allocating the quantization error correction component calculated by the subtracter to a plurality of the pixels positioned around the target pixel,
   wherein the quantizing means outputs the quantized density and the quantization error component of the target pixel by performing an addition using the density of the target pixel contained in the image data, the density of the target pixel contained in the preliminary ejection data, and an accumulated diffused error component assigned to the target pixel by the allocator when other pixels are quantized.

2. The image data processing apparatus according to claim 1, wherein
   the quantizing means includes:
   an adder for calculating a total density of each target pixel, by adding up the density of the target pixel contained in the image data, the density of the target pixel contained in the preliminary ejection data, and the accumulated diffused error component assigned to the target pixel by the allocator when other pixels are quantized; and
   a quantizer for generating the quantized density for each target pixel by using the one or more thresholds to quantize the total density calculated by the adder and for outputting the quantization error component occurring in association with the generation of the quantized density.

3. The image data processing apparatus according to claim 2, wherein
   the quantizer includes mean value calculating means for calculating the mean value of the densities of a plurality of previously quantized pixels around the target pixel, using the densities corresponding to the respective quantized densities of the previously quantized pixels; and
   threshold determining means for determining the mean value as to be a median of the one or more thresholds.

4. The image data processing apparatus according to claim 3, wherein
   the mean value calculating means weighs the density of each pixel in such a manner that a weight is increased with a decrease in the distance from the target pixel, and calculates the mean value thereafter.

5. The image data processing apparatus according to claim 2, wherein
   the quantizer includes mean value calculating means for calculating the mean value of the densities of the target pixel and a plurality of previously quantized pixels around the target pixel, for each case that the density of the target pixel is either one of the densities corresponding to the quantized densities; and
   the quantized density of the target value generated by the quantizer corresponds to the threshold related to the smallest one of absolute values resulting by subtracting the total density of the target pixel from mean values thus calculated.

6. The image data processing apparatus according to claim 5, wherein
the mean value calculating means weighs the density of each pixel in such a manner that a weight is increased with a decrease in the distance from the target pixel, and calculates the mean value thereafter.

7. The image data processing apparatus according to claim 2, wherein
the quantizer forcedly generates a quantized density other than 0, for each pixel whose density contained in the preliminary ejection data is not 0.

8. The image data processing apparatus according to claim 1, wherein
the quantizing means includes:
an adder for calculating a total density of each target pixel, by adding up the density of the target pixel contained in the image data and the accumulated diffused error component assigned to the target pixel by the allocator when other pixels are quantized;
a first quantizer for generating a first preliminary quantized density for each target pixel by using the one or more thresholds to quantize the total density calculated by the adder and for outputting the quantization error component occurring in association with the generation of the first preliminary quantized density;
a second quantizer for generating a second preliminary quantized density for each target pixel by using the one or more thresholds to quantize the density of the target pixel contained in the preliminary ejection data; and
a combiner for outputting for each target pixel the quantized density obtained by combining the first preliminary quantized density generated by the first quantizer and the second preliminary quantized density generated by the second quantizer.

9. A liquid ejection apparatus, comprising:
a conveyor which conveys a recording medium;
a liquid ejection head having a plurality of ejection openings, which eject a liquid to the recording medium conveyed by the conveyor;
an image data processing apparatus according to claim 1; and
a head drive apparatus which drives the liquid ejection head so that the ejection openings eject a volume of liquid corresponding to the quantized density generated by the quantizing means.

10. The liquid ejection apparatus according to claim 9, wherein the preliminary ejection data is formed so that the liquid is preliminarily ejected from the ejection openings at a predetermined cycle.

11. The liquid ejection apparatus according to claim 10, wherein the predetermined cycle is determined based on at least one of: a conveyance speed of the recording medium, an ink type, the ambient temperature and humidity around the ejection openings.

12. An image data processing method for a liquid ejection apparatus which ejects a liquid related to image formation and a liquid related to preliminary ejection from a plurality of ejection openings towards a recording medium, the method comprising the steps of:
(a) storing image data in which each pixel of a plurality of pixels disposed in a matrix has a density related to an image to be recorded on a recording medium;
(b) generating a quantized density for a target pixel in the plurality of pixels and for outputting a quantization error component occurring when generating the quantized density, the quantized density being generated by using one or more thresholds to quantize a density of the target pixel in the plurality of pixels into two or more values; and
(c) calculating a quantization error correction component by subtracting a density of the target pixel contained in preliminary ejection data from the quantization error component output from the quantizing means in relation to the target pixel, each pixel of the plurality of pixels contained in the preliminary ejection data having a density related to a preliminary ejection pattern to be formed on the recording medium through preliminary ejection;
(d) allocating the quantization error correction component calculated in the (c), to a plurality of the pixels positioned around the target pixel,
wherein: in the (b), the quantized density and the quantization error component of the target pixel are output, by performing an addition using the density of the target pixel contained in the image data, the density of the target pixel contained in the preliminary ejection data, and an accumulated diffused error component assigned to the target pixel in the (d) when other pixels are quantized; and wherein the steps are repeated while changing the target pixel.

13. The method according to claim 12, wherein
the (b) includes sub steps of:
(I) calculating a total density of the target pixel, by adding up the density of the target pixel contained in the image data, the density of the target pixel contained in the preliminary ejection data, and the accumulated diffused error component assigned to the target pixel in the (d) when other pixels are quantized; and
(II) generating the quantized density for the target pixel by using the one or more thresholds to quantize the total density calculated in the (I) and for outputting the quantization error component occurring in association with the generation of the quantized density.

14. The method according to claim 13, wherein
the (II) includes sub steps of:
(i) calculating the mean value of the densities of a plurality of previously quantized pixels around the target pixel, using the densities corresponding to the respective quantized densities of the previously quantized pixels; and
(ii) determining the mean value as to be a median of the one or more thresholds.

15. The method according to claim 14, wherein
in the (ii), the density of each pixel is weighed in such a manner that a weight is increased with a decrease in the distance from the target pixel, and the mean value is calculated thereafter.

16. The method according to claim 13, wherein
in the (II), a quantized density other than 0 is forcedly generated, for each pixel whose density contained in the preliminary ejection data is not 0.

17. The method according to claim 12, wherein
the (b) includes sub steps of:
(I) calculating a total density of the target pixel, by adding up the density of the target pixel contained in the image data and the accumulated diffused error component assigned to the target pixel in the (d) when other pixels are quantized; and
(II) generating a first preliminary quantized density for the target pixel by using the one or more thresholds to quantize the total density calculated in the (I) and for outputting the quantization error component occurring in association with the generation of the first preliminary quantized density;

(III) generating a second preliminary quantized density for the target pixel by using the one or more thresholds to quantize the density of the target pixel contained in the preliminary ejection data; and (IV) outputting for the target pixel the quantized density obtained by combining the first preliminary quantized density generated in the (II) and the second preliminary quantized density generated in the (III).

18. The method according to claim 12, wherein the preliminary ejection data is formed so that the liquid is preliminarily ejected from the ejection openings at a predetermined cycle.

* * * * *